(12) United States Patent
Coppens

(10) Patent No.: US 6,333,019 B1
(45) Date of Patent: Dec. 25, 2001

(54) METHOD FOR OPERATING A CHEMICAL AND/OR PHYSICAL PROCESS BY MEANS OF A HIERARCHICAL FLUID INJECTION SYSTEM

(76) Inventor: Marc-Olivier Coppens, Tuinwijklaam 47, B-9000 Gent (BE)

( * ) Notice: Subject to any disclaimer, the term of this patent is extended or adjusted under 35 U.S.C. 154(b) by 0 days.

(21) Appl. No.: 09/301,971

(22) Filed: Apr. 29, 1999

(51) Int. Cl.[7] ............................ B01D 47/00; C07C 27/00; C07C 27/06
(52) U.S. Cl. .................. 423/659; 23/293 R; 23/313 FB; 261/20; 261/DIG. 70; 261/DIG. 71; 423/DIG. 16; 518/728
(58) Field of Search .......................... 423/659, DIG. 16; 23/293 R, 313 FB; 261/20, DIG. 70, DIG. 80; 518/728

(56) References Cited

U.S. PATENT DOCUMENTS

| 4,537,217 | 8/1985 | Allen, Jr. et al. ..................... 137/561 |
| 4,999,102 | 3/1991 | Cox et al. ............................. 210/137 |
| 5,354,460 | 10/1994 | Kearney et al. ................... 210/198.2 |
| 5,938,333 | * 8/1999 | Kearney .............................. 366/336 |

FOREIGN PATENT DOCUMENTS

WO 98/14268 * 4/1998 (WO) .
WO 99/48599 * 9/1999 (WO) .

OTHER PUBLICATIONS

Kearney M., Fractals in Engineering, INRIA Proceedings, Jun. 25–27, 1997, Arcachon, France.
Kocherin, V. Kearny, M, Kroon, M and Olujic, Z, AIChE Annual Meeting, Los Angeles, Nov. 16–21 (1997), Recent Developments in Distillation, Absorption and Stripping.
Kearney, M., Control of Fluid Dynamics with Engineered Fractal Cascades—Absorption Process Applications, Session 40, 1997 Annual Meeting American Institute of Chemical Engineers, Pasadena, Nov. 18 (1997), Abstract.

* cited by examiner

*Primary Examiner*—Wayne Langel
(74) *Attorney, Agent, or Firm*—Weingarten, Schurgin, Gagnebin & Hayes LLP

(57) ABSTRACT

The invention relates to injection of fluids (gas, liquid, suspension or other mixtures) in a controlled typically uniform way within a vessel containing another fluid or fluidized medium. Said injection device consists of pipes or channels that are connected in a hierarchical fashion so that the fluid entering a first channel is divided into channels of the same or different diameter and length, each or some of which are further divided into channels of the same or different diameter and length, and so on. The injection system can also consist of combinations of such tree-like or fractal-like elements, embedded in the plane or in space.

The embodiment depends upon the nature of the fluids and the application. The invention can be used for gas/solid fluidized bed and a gas/liquid and other processes. A typical application is the reduction and uniformization or otherwise control of bubble sizes to optimize the operation of fluidized bed, slurry and gas/liquid reactors.

9 Claims, 3 Drawing Sheets

METHOD FOR OPERATING A CHEMICAL AND/OR PHYSICAL PROCESS BY MEANS OF A HIERARCHICAL FLUID INJECTION SYSTEM

BACKGROUND

The invention relates to a method for operating a chemical and/or physical process, e.g. a fluid bed reaction, and especially deals with the injection of fluids, such as gases, liquids and/or suspensions in a controlled typically uniform way. More in detail, the chemical and/or physical processes are carried out within a vessel containing a fluid or fluidized medium, which medium can be a gas and/or a liquid, optionally in combination with solid particles. The fluids are injected using an injection device consisting of tubes or channels that are connected in a hierarchical fashion so that the fluid entering a first channel is divided into channels of the same or different diameter and length, each or some of which are further divided into channels of the same or different diameter and length, and so on. The is injection system can also comprise combinations of such tree-like or fractal-like elements, embedded in a plane (two-dimensional) or in space (three-dimensional).

Multiphase reactors or multiphase contacting devices, are commonly applied in process industry In such processes two or more fluids have to be brought into contact with each other to efficiently transfer one or more components from one phase into another phase, where the reaction or contacting process occurs. This is in particular so for transport limited processes, of which there are many in industrial practice.

The invention can be used for gas/solid fluidized bed, gas/liquid and other processes. A typical application is the reduction and uniformization or otherwise control of bubble sizes to optimize the operation of fluidized bed, slurry and gas/liquid reactors The embodiments of the present invention will depend upon the nature of the fluids and the application.

An important example is a fluidized bed reactor, where gas is injected through a distributor plate in the bottom of a vessel to fluidize a bed of solid particles that are to react with the gas or catalyze a chemical reaction between gas molecules, Gas bubbles grow from the bottom to the top of the bed as a result of the pressure difference-over the bed, simply because of the thermodynamics. The movement of the fluidized solid particles and the bubbles is turbulent, chaotic, and strongly dependent on the operating conditions.

Fluidized bed reactors are of considerable economic importance. An example of a large scale process that is preferably carried out as a fluidized bed process is the Fischer-Tropsch synthesis of liquid fuel from synthesis gas, which can be obtained by steam-oxygen gasification of coal or other hydrocarbons. This process involves the contacting of the gas stream with solid catalyst particles to produce the fuel:

$$aH_2 + bCO = C_xH_y + zH_2O$$

Another important example in which similar problems occur is a gas/liquid process carried out in a bubble column or stirred tank reactor The gas moves up from a distributor through a reactor vessel. The movement of the bubbles is again extremely complex. Typically, the shape and size of the bubbles cannot be or is hardly controlled and bubbles coalesce and grow as a result of the pressure difference between the top and the bottom of the reactor. A mixing device and fixed internals may be installed inside the vessel to improve the mixing by increasing the turbulence in the bed. Similar complex hydrodynamics exist for other processes in which several fluids or fluidized media are contacted to react or catalyze reactions.

To optimize the reaction process, the interfacial area between the fluid phases should be maximized or otherwise controlled. With the presently used reactor systems or physical contacting devices, this forms a serious problem, especially because the hydrodynamics, as described above, are so complex.

Mixers can be used to increase turbulence and contacting, but they consume costly energy. In other cases, such as gas/solid fluidized beds, mixers may not be used. In addition, mechanical problems arise when mixing devices are employed.

Homogenization, i.e., achieving equal conditions at every point in the reactor vessel, is difficult to achieve. Imposing particular concentration or partial pressure profiles is even more difficult or for most reaction systems impossible The existence of dead volumes, where no or much less reaction occurs, because of decreased local flow, is often inevitable.

Another problem in current realizations of such multiphase reactors and other processes involving several fluids or fluidized media that need to be contacted is 'scaling up' of these devices. A process is usually first investigated on a smaller scale, e.g. on lab scale, bench-scale or pilot scale, and then needs to be scaled up to the typically much larger industrial scale. Rules to scale up multiphase processes are typically empirical or at least semi-empirical and the errors are very large, because the processes are influenced by the hydrodynamics. With the present methods, it is a serious challenge to maintain similar hydrodynamics during scale up from the small to the large scale, In most cases, this is even impossible.

Whenever in this specification and the appended claims reference is made to a 'vessel' it is to be understood that this refers to a container for fluids and optionally particles, in which optionally provisions are made to feed additional fluids and/or particles, and optionally provisions are made to remove fluids and/or particles. Preferably such a vessel is operated in a continuous process. The examples of processes mentioned above, are all carried out in vessels.

In the prior art several publications are known which address at least part of the above mentioned problems.

In U.S. Pat. No. 4,537,217 a fluid distributor is disclosed having a distribution surface with a plurality of uniformly spaced distribution openings, which is particularly suitable for application in chromatography.

U.S. Pat. No. 4,999,102 discloses a liquid distributor for distributing and/or collecting a liquid in large scale industrial processes, such as absorbers or desorbers.

U.S. Pat. No. 5,354,460 discloses a fluid transfer system for obtaining uniform liquid distribution in industrial scale fluid transfer systems which accommodate plug flow operations.

All of theme publications relate to the uniform is distribution or collection of a liquid by means of a planar device which stretches out horizontally. The devices described in these prior art documents are placed at the inlet or outlet of the corresponding unit-operation. Each point in the plane would be reached, were the constructions described in these documents continued ad infinitum. At the outlets, the liquid pours out or is collected in a uniform way; typical applications are in chromatography.

Finally, Kearney (in: Fractals in Engineering, INRIA Proceedings, Jun. 25–27, 1997, Arcachon, France) describes a three-dimensional mixing unit, which consists of a recursive structure of pipes. This structure is suitable for emulating turbulence using laminar flows.

The structures disclosed in above mentioned patents are not suitable or optimal for controlling three-dimensionally local parameters such as pressure and flowrates for improved operation of chemical and/or physical processes in vessels, such as described hereinbefore. Moreover, none of these documents is directed to multiphase processes, nor to scaling up such processes.

SUMMARY OF THE INVENTION

It has now been found that the above mentioned problems can be solved by introducing a fluid in said vessels by means of a hierarchical network of channels comprising parent and child generations of channel formations, wherein substantially each channel in a parent generation is divided into N channels of the child generation, which network terminates in channel exits, such that said fluid is discharged from the channel exits substantially uniformly-throughout the vessel volume.

By discharging the introduced fluid substantially uniformly throughout the vessel volume, as is enabled by the network structure, it was found that the operation of the processes which were carried out in said vessels is improved considerably. The introduction of fluids through said network results in equal pressures at all outlets of the tree. When the fluid is a gas, this leads to equal or otherwise controlled bubble sizes, distributed as directed by the position of the outlets inside the vessel. A substantial uniform discharge of the fluid is intended to refer to a situation in which the discharge conditions with respect to local pressure and/or fluid velocity at substantially all channel exits is substantially the same.

BRIEF DESCRIPTION OF THE INVENTION

The network of channels according to the intention is a recursive structure, in which different generations of channel formations can be distinguished. When reference is made to a 'parent generation', a formation of channels having a certain geometry and a certain size is meant. Each formation can comprise one or more channels or groups of channels, which channels are essentially of the same size or which groups of channels comprise channels of the same size in essentially the same orientation, and the geometry of which channels or groups of channels are the same and these channels or groups of channels are arranged in any mutual order within each formation, although usually the arrangement within each formation will be regular or otherwise well defined A 'child generation' is intended to be a formation of channels, which channels are substantially similar in geometry to the channels of the corresponding parent generation from which it is branching, and either of the same or smaller size.

Substantially each channel of a parent generation branches into N channels which are members of its child generation The value of N will depend on the process and what is practically achievable. According to the present invention, N is at least 2. The upper limit of N will be strongly determined by what is practically achievable, typically N will be smaller than about 8, preferably smaller than 6.

One of the surprising features of the present invention is that when N is not the same for all channels, for example when one of the channels is clogged, resulting in stopped flow of all the channels belonging to its child generation or generations, this does not necessarily adversely influence the process. Therefore, according to the invention, some variation in the value of N throughout the network is acceptable, depending on the application and the generation of channels it refers to, as long as substantially each channel branches into N channel. This means that according to the present invention a small fraction of the channels may branche in less than N channels, or even into no channels at all, without departing from the general concept of the present invention The injection devices which are used in the present invention comprise successive generations of channels, the first generation of channels being fed by a formation which is not necessarily a hierarchic structure. The last generation (bearing the highest number) comprises the channels that discharge in the vessel The number of generations will depend on the type of process. For a given application the person skilled in the art will be able to establish the required number of generations to construct a network that fills the volume of the vessel in an adequate manner. Usually, for most practical applications the number of generations does not exceed about 10.

Channels are defined here as structures capable of transporting fluids, such as pipes, hoses or any duct.

In a preferred embodiment of a method according to the present invention, the network is a self-affine network of channels, i.e. a network wherein for several generations, the ratio of successive lengths is constant for channels of different generations running in the same direction. The ratio of successive diameters in a self-affine network is also constant, but the length and diameter ratios need not be the same. In this preferred embodiment each of the channels in the parent generation have a diameter $d_j$ and length $l_j$ and each of the channels in the child generation have a diameter $d_{j+1}$ and length $l_{j+1}$, wherein the ratios $d_j/d_{j+1}$ and/or the ratios $l_j/l_{j+1}$ are substantially constant for channels of successive generations running in parallel direction. In this embodiment said network can also be a self-similar network which is a type of said self-affine network wherein the ratios $d_j/d_{j+1}$ and $l_j/l_{j+1}$ are substantially constant for channels of successive generations independent of their direction.

By employing a self-affine network, optimal use can be made of the available volume of the vessel, which often has dimensions that are not equal in all directions. A self-similar network would be especially useful in processes which are carried out in vessels which have more or less equal dimensions in all directions.

The networks of channels in the method of the present invention can also be combined, viz. it is possible to construct networks comprising sub-networks that are self-affine or self-similar without departing from the general concept of the present invention. Such a combined network is therefore not necessarily self-affine or self-similar, but as long as it comprises elements that are at least substantially self-affine or self-similar, the effects of the present invention can be obtained.

Although self-affine and self-similar structures are preferred embodiments of the present invention, and although the requirement of self-affinity or self-similarity results in a structure wherein all exits have similar dimensions, deviations from this definition can exist in networks according to the invention, without departing from the general concept of the present invention. Such 'non-perfect' structures can still provide the desired effect described herein. In fact it is sometimes desirable to introduce such deviations from the strict self-affine and self-similar structures on purpose, for example in order to further minimize the influence of gradients, such as pressure and/or concentration gradients, which often inevitably exist in vessels in which the networks according to the present invention are applied. By carefully varying the length and diameter of the channels of the network, in particular the diameter of the channels near the exits, gradients in factors such as local bubble size, pressure drop and/or hydraulic path length can be imposed and consequently an even better control of the process is possible.

This feature which enables enhanced controlling and becomes possible with the hierarchical fluid injection system according to the present invention will be referred to as to 'otherwise control' the processes wherein it is applied. It was found that the variations in exit diameters could be introduced quite simply by plugging the exits of the network with different plugs having holes of varying diameter.

Strictly speaking, self-affine or self-similar embodiments of the present invention require that each successive generation comprises channels that are in the same direction as the corresponding channels in the parent generation, or that the child channels are regularly rotated with respect to their corresponding parent channels, the rotation being the same for each successive generation. It is to be understood that small deviations from this strict requirement need not influence the applicability of the channel network. In general, the influence of such deviations from this strict self-affinity or self-similarity with respect to orientation, becomes less in higher generations, i.e. in generations closer to the exits. This can be convenient in practical applications, since it allows flexibility in applying the network injection devices according to the present invention.

It has also been found that especially suitable networks for application in a method according to the present invention can be obtained when such networks are constructed such that the ratios of diameters and/or lengths of channels in successive generations of said network are related to N by $$N=(d_j/d_{j+1})^\Delta$$

and/or $$N=(l_j/l_{j+1})^b,$$

wherein $\Delta$ and D represent an integer or a real positive number.

It has been found that the control of flow or diffusion through the channels is especially effective when the above mentioned relations are fulfilled. The method according to the invention can be easily optimized by using these relations, as will be explained hereafter.

Preferably the value of D is between 2 and 3. In this case the resulting network will make use of the volume it extends in, while at the same time avoiding interference with the fluid inside the vessel which may be in motion and leaving enough space for the multiphase process that takes place inside the vessel Preferred processes in which any of the above mentioned networks can be successfully applied, are fluidized bed processes, slurry processes, gas/liquid bubble column processes and aeration processes, since all of these processes suffer from the problems set out in the above and can therefore benefit from the method of the present invention.

For instance aeration processes are carried out in an aerator which contains an aqueous liquid phase in which a solid phase biomass is present. The biomass must be kept in suspension and a certain degree of turbulence must be maintained. Oxygen is supplied by bubbling air through the reactor By applying a network as set out in the above, optimal mixing can be obtained, even without employing moving parts, and at the same time the formation of too large air bubbles is avoided.

Another surprising advantage of the present invention is the ease of scale up of processes. A method for scaling up according to the present invention comprises building a small scale vessel in which vessel a fluid is introduced through a hierarchical network of channels which can be any network as described in the above, such that said fluid is discharged from the channel exits substantially uniformly throughout the vessel volume and determining optimal geometry and optimal values for the parameters N, $\Delta$ and D, and subsequently building a large scale vessel in which said geometry and parameters are substantially the same as in the small scale vessel. According to this method N, D and $\Delta$ are kept constant but the number of generations as well as the absolute respective lengths and/or diameters may differ to suit the demand of the large scale application.

The network according to the invention could be modified to further control the processes wherein it is applied, by having at least one material present near the exits of said network and/or said material is present as a coating on at least part of the inner surface of said network, which material is capable of chemical and/or physical interactions with fluids. Such materials could eg. be a catalyst, an ion exchanger and/or an adsorbent. Examples are zeolites or ion exchange resins.

As mentioned in the above, further control can also be obtained by providing to any of the above mentioned networks means for obtaining a gradient in the dimensions of the respective exits. It was found that the variations in exit diameters could be introduced quite simply by plugging the exits of the network with different plugs having holes of varying diameter. When applied in a bubble column for instance, such an injection system could provide a means to further control the uniformity of the process by imposing the bubble sizes. When applied in fluidized beds, a gradient in the exit diameters of the channels of the hierarchic channel network system could provide a means to further control the uniformity of the process, since bubbles introduced near the bottom could reach diameters that, in the absence of any intrinsic pressure gradient resulting from the fluid column, would be substantially larger than the bubbles that are introduced near the top of the column.

The method according to the present invention enables optimized production using the above mentioned processes in combination with hierarchic network channels.

The networks of the present invention can be constructed easily by a variety of methods. For example, T- or Y-shaped elements can be connected easily by all kinds of means, such as gluing, soldering, welding, clamping, etc. Such networks can be easily extended by simply adding additional elements.

Suitable materials for constructing the networks according to the present invention are all materials that are essentially inert to the reaction conditions, e.g. stainless steel, or other metal, glass, quartz glass, etc.

It is also possible to use a bundle of flexible channels, which are subsequently formed to the desired shape, viz. having their exits at the desired location in space In such a network of all similar channels, $\Delta=2$.

It should be mentioned that the actual structure of the hierarchical network is quite different for different processes. A channel may split into N channels, of which the lengths and diameters are the same or, usually, smaller than that of the parent channel. Each of these channels splits in the same or different way. A typical, yet not the only possible, division is such that, within a certain range of scales, a self-similar or self-affine network results: for several generations, the ratio of successive lengths is constant. The ratio of successive diameters is also constant, but the length and diameter ratios need not be the same. The ratios of diameters will control the flow or diffusion through the channels. Assume, e.g., a division of each channel of diameter $d_j$ into N new channels of diameters $d_{j+1}$. The ratio $d_{j+1}/d_j$ is typically maintained constant over several generations. Then, the diameter exponent $\Delta$ can be defined as follows:

$$(d_j)^\Delta = N(d_{j+1})^\Delta \text{ or } N = (d_j/d_{j+1})^\Delta$$

If the diameter exponent $\Delta=2$, the flow rates are the same through successive constructions, because the flow cross-section is the same throughout; when all the small branches of a certain generation are taken together then the sum of cross-sectional areas of all channels belonging to a certain generation is the same as the cross-sectional area of the preceding generation.

When $\Delta$ is 3, however, a complete volume is reached, but the flow is slowed down through the network. $\Delta$ may take intermediate values with corresponding effect. If all channel diameters are the same, $\Delta$ becomes infinitely large.

Optimal values of $\Delta$ depend on the type of process. A person skilled in the art will be able to determine, optionally aided by routine experiments optimal values for each process.

The set of outlet points of all the channels is, in the limit for an infinite number of generations, a fractal, with a fractal dimension D defined by the self-similar branching. If a finite subset, and possibly all points, are reached within the (embedding) space in which the network lies, then the fractal dimension D equals the embedding dimension, i.e., 3 for a volume and 2 for a structure within a plane. For a 'network' consisting of a single channel, D would become zero because thereis only one outlet. By controlling thee branching ratio N and the ratio of successive lengths of the elements or channels that are combined in the network, $l_{j+1}/l_j$, the fractal dimension D, defined by:

$$(l_j)^D = N(l_{j-1})^D$$

or $$N = (l_j/l_{j+1})^D$$

may be modified to take fractional values in between zero and the embedding dimension (2 or 3). In this way, through D and $\Delta$ and the relative orientation of successive units in the hierarchy, a variety of structures can be formed.

Advantages such as robustness, trivial scalability and/or ease of construction of such hierarchical designs for technical applications as described above have not been perceived until now. The above cited prior art relates to the uniform distribution or collection of a liquid by means of a planar (two-dimensional) device in which all the channels have the same lengths or form a hierarchical network of a well-defined, specific structure disclosed in the patent Each point in the plane would be reached, were the constructions described in the patent continued ad infinitum, hence D=2. At the outlets, the liquid pours out or is collected in a uniform way; typical applications are in chromatography.

The prior art structures are not suitable or optimal for the present applications to which the present invention relates, for which other D and $\Delta$ may and will usually be better, and combinations of hierarchical structures can be employed. Also, the devices described in the present patent are used inside a three-dimensional or possibly quasi-two-dimensional vessel (i.e., a vessel where one of the dimensions is much less than the other two), and not on top or below it. Applications are typically in the field of multiphase reactor engineering, although not limited to the latter. If D=2, every point in the plane will be reached, yet the complete available surface area is filled. This may be optimal for a distributor, yet not for an injector inside a vessel, where a large free volume needs to remain available for the reactions, absorption or other physico-chemical processes.

Another device according to the present invention can be used to distribute a fluid in a controlled and typically uniform way, so that the pressure drop from the inlet or inlets to the multitude of outlets is the same or otherwise controlled through the geometry of the structure. This device has the following design. A first channel, through which a fluid enters the device, splits in $N_1$ channels of the same or lower diameter and length, each of which again splits in $N_2$ channels of the same or lower diameter and length, and so on, until a smallest scale. Several such hierarchical constructions may be linked into a larger spatial structure: in this case, one main inlet pipe typically branches out into $N_0$ hierarchical fluid injection structures. The complete injection device is placed inside a vessel; depending on its size, if necessary, it is attached to the walls of the vessel.

Although the disclosed family of structures to which the claims relate is more general, (fractal) self-similar and self-affine designs are particularly attractive because of the ease of scaling up such structures. A self-similar structure is one where parts of the structure are rescaled copies of the whole; this is in principle only possible for true fractals with an infinite scaling range—the self-similarity is therefore interpreted to be valid only down to a smallest scale, the inner cutoff. For a self-affine structure, the similarity ratios of elements in different directions is different; they appear like stretched self-similar structures Self-affine structures are also scaleable and may be attractive alternatives to self-similar structures for vessels that have different dimensions in different directions (e.g., a cylinder with a diameter different from its height). Easy scalability and facilitated construction in a wide range of sizes are two results of this hierarchical structure. It suffices to add additional generations in the hierarchical cascade(s) to make a larger structure, without changing the flow pattern. These are some of the features that make the networks of channels according to the present design attractive.

The largest and smallest sizes of the channels in the hierarchical fluid injection system depend on the particular application and on the size of the vessel The fluid outlets are usually at the last stage. They may have a special process-dependent shape or structure that is different from all other channels and contain a porous plug, non-catalytic or catalytic material, depending on the application.

The branching ratios of the hierarchical fluid injection system, $N_1$, $N_2$, etc need in principle not be equal to each other, but in a self-similar or self-affine scaleable structure (the preferred embodiment for many applications), they are all equal and denoted by N.

Another interesting possibility is that $N^I = N_1 = N_3 = N_5 = \ldots$ and $N^{IX} = N_2 = N_4 = N_6 = \ldots$ so that $N = N^{II} = $ constant. Obvious generalizations hereof are also possible.

Two or more successive branchings may actually be considered as belonging to the same (double) generation, which makes the final design also self-similar or self-affine, apart from the inlet channel or 'trunk' of the tree.

By the definition given above, the ratio of the sizes of successive elements is constant and the same in all directions for a self-similar design, while in a self-affine design, the generation independent ratio is different in different directions (e.g., the vertical and the horizontal directions). Again, the trunk, connecting different trees, is the natural exception. The diameter exponent Δ and the fractal (similarity) dimension D, defined earlier, are two characteristic numbers for the hierarchical construction, as they are directly related to the ratio of successive channel diameters and lengths respectively.

Their values are very important to achieve a uniform or otherwise controlled injection of fluid into the vessel containing the second fluid. They are strongly dependent on the application. In general, high values of Δ are suitable for bulkier structures that fill more apace, but the resistance to flow through the structure is low. High values of D may also typically yield bulkier structures, although the bulkiness may be compensated by a lower value of Δ. When D is higher, the inlets reach a larger fraction of the vessel, yet less space is available for the fluid inside the vessel, which may not be desirable. The optimum of D, Δ, the number of generations, and the branching ratios, is clearly determined by the problem at hand, viz. the process to be operated, yet the global geometrical properties of the hierarchical structure claimed through this patent are similar and described as above; all these structures belong to the same family.

The facile control over the distribution of the fluid injection point locations and of the constant or otherwise controlled injection flow rates of the injected fluid, means that a physico-chemical process inside the vessel can be geometrically controlled in a unique way Homogenization or uniformization of flow is usually attempted by mixing, which involves mechanical devices that consume energy and are more complex to build and maintain than the present invention Although a hierarchical fluid injector may be used as a fluid injecting mixer, it does in its typical operation mode not involve moving parts, presenting another advantage over conventional designs. Another advantage is that a hierarchical unit can also be very robust against clogging, which is especially important when solids are involved in the process.

BRIEF DESCRIPTION OF THE DRAWINGS

It is to be understood that the shown embodiments only serve as good examples to carry out the invention in-particular situations, yet that the structures to which this application relates are much more general, as described above.

The shaded areas indicate channels belonging to the first generation (1) and channels belonging to the third generation (3).

Figure 2:
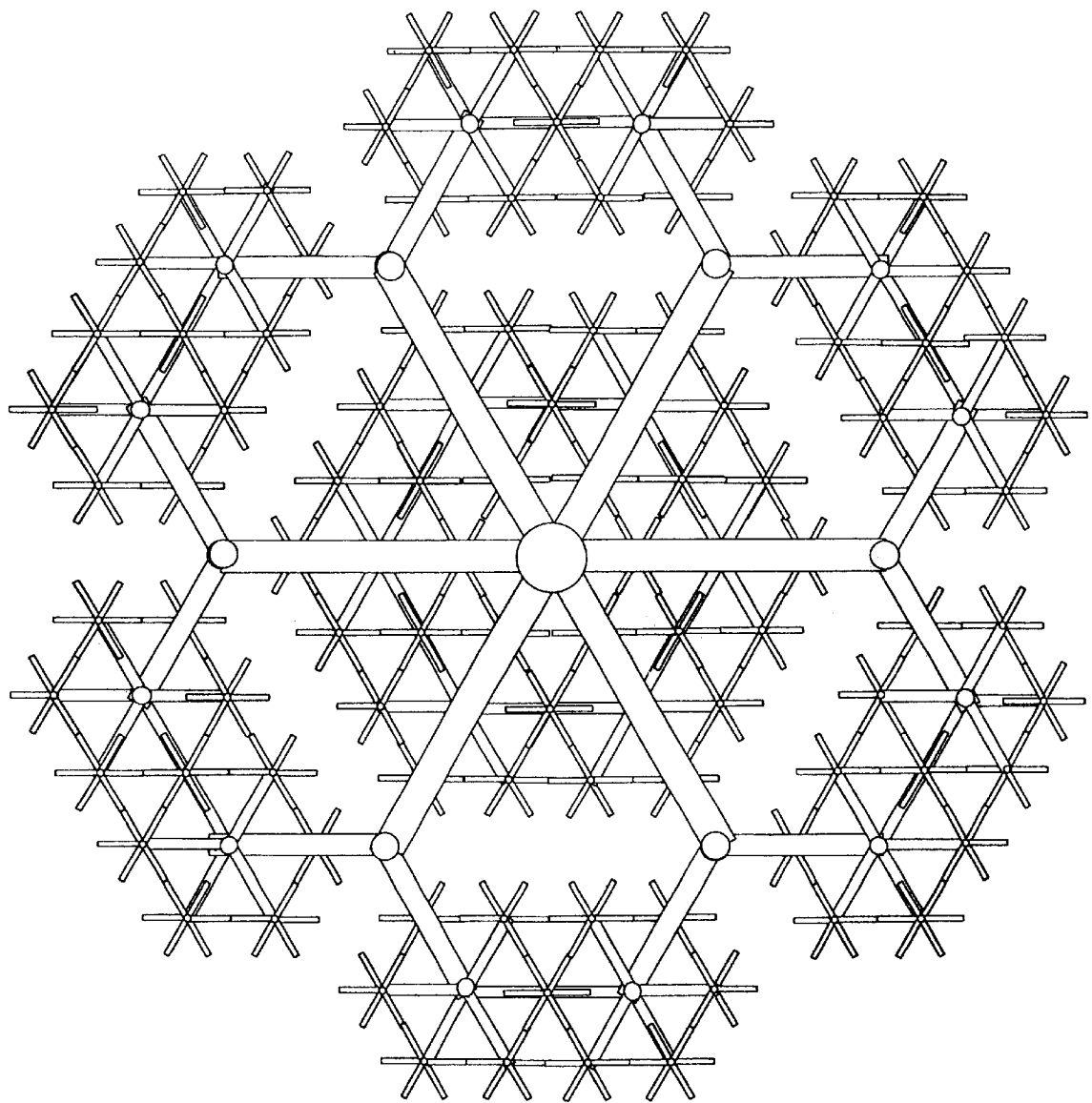

FIG. 2 shows a two-dimensional projection (looking top down) of a three-dimensional fluid injection device that can be used to inject secondary gas in a gas/solid fluidized bed or in a gas/liquid reactor.

Figure 3:
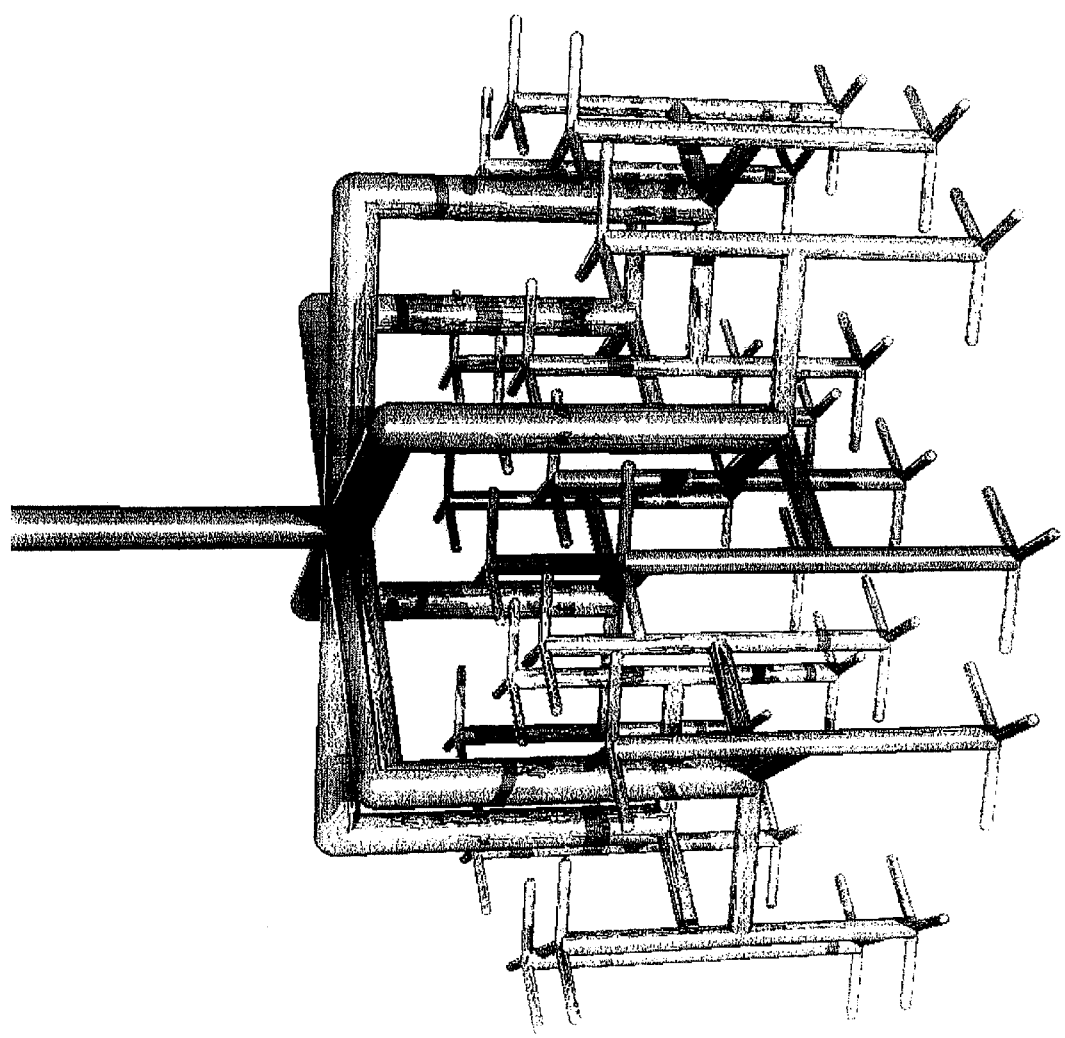

FIG. 3 shows the same fluid injection device as in FIG. 2 but under a different angle.

The invention will now be illustrated by the following examples, which are added for illustration only and are not intended to limit the scope of the invention in any sense.

EXAMPLE 1

Figure 1:
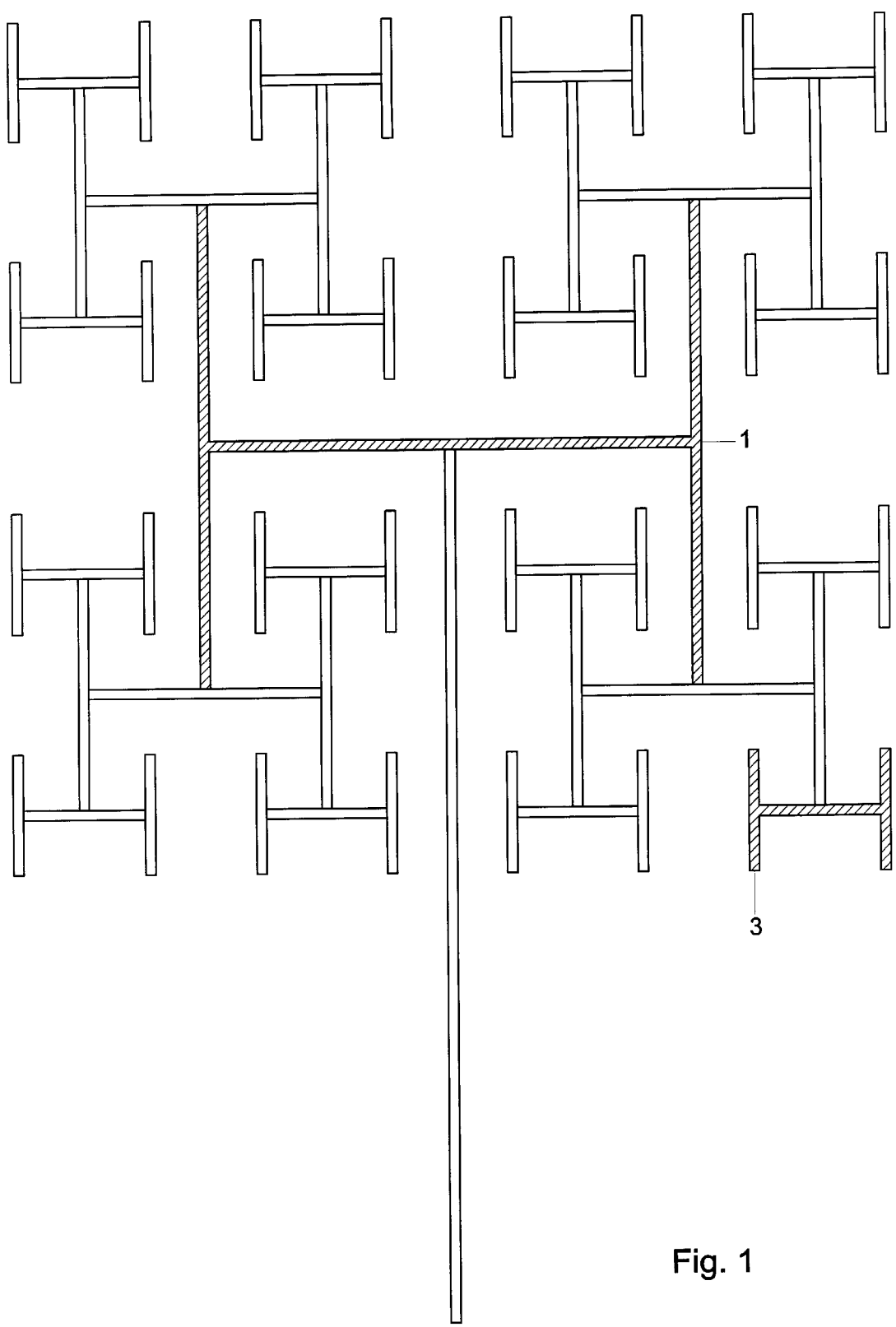
FIG. 1 shows a two-dimensional projection of a quasi-two-dimensional fluid injection device that can be used to inject secondary gas in a gas/solid fluidized bed. When the device is put inside a bed of solid particles, fluidized at minimum fluidization by a distributor under the bed, fluidization is uniform and the bubbles are of a constant and controlled size, under a wide range of operating conditions.

A device as depicted in FIG. 1 was assembled out of Plexiglas tubes to observe and illustrate the capabilities of a hierarchical fluid injection system. It consisted of a central tube. which divided into 2 tubes that further divided into 2 tubes, all in the same plane so as to form an H-shape connected to the central tube. The horizontal bar of the H was as long as each of the vertical bars. Four hollow H-shapes, twice as small as the just described H, were connected to the open extremities of the latter H. All tubes in this example had the same diameter, were hollow and contained a hole in the middle to connect to a tube of the previous generation. The connections were made using glue and such that there were no leaks. The entire network measured about 30 cm.

The hierarchical construction was submerged in a fluidized bed of solid particles The bed was fluidized at minimum fluidization (the particles were just fluidized as an emulsion phase) using an air stream through a distributor below the bed, i.e., the common way of operating a fluidized bed. Secondary air was injected through the hierarchical fluid injection system. Under a wide range of conditions (tested until 6 times the minimum fluidization rate), the bed was fluidized with small uniformly distributed bubbles. Air distribution through the lower distributor only, gave rise to a swarm of very large and smaller bubbles, which coalesced. Additional air injection through the described injection device changed the movement from highly chaotic to nicely controlled and uniform, as desired. Even after partial clogging of some tubes by solid particles, the unit functioned in an excellent way, demonstrating its robustness.

EXAMPLE 2

A three-dimensional hierarchical fluid injection device according to FIGS. 2 and 3 was assembled from tubes of the same materials as in the previous example, yet they did not have the same size. A vertical central tube divides into 6 tubes, branching out horizontally with their endpoints on a regular hexagon. From the endpoint of each tube descends another tube. In the present example, each of the latter tubes branched into 3 tubes in the same plane. This 'generating unit' repeated through a self-similar cascade. From the endpoints of each of these tubes, said generating unit was connected vertically up and vertically down. The vertical tubes were connected. The 3 horizontal tubes of the upper generating unit were oriented in a direction directly opposed to that of the tubes of the lower unit, and the tubes are parallel to the tubes forming the hexagon mentioned above. This procedure was continued in a recursive way. Fluid could flow from the inlet through the structure to and through each of the extremities of the smallest tubes. The diameter of the network was 35 cm.

Diameter and length ratios of the tubes are variable and depend on the particular application. For a gas/liquid process, it was found that a low value of the diameter exponent Δ is favorable, while for a gas/solid process a higher value with a few generations is best. In the shown self-similar design, by means of example, the fractal dimension was D=log 6/log 2≈2.58. In the described implementation, a projection of the setup will give a hexagonal grid, as shown in the figure: the dimension of this projection is 2, which means that bubbles of a gas flowing through the structure may rise through the vessel and reach a maximum volume, even while the total structure does not occupy too much space, as indicated by the low value of the fractal dimension, substantially lower than 3.

EXAMPLE 3

A structure similar to FIG. 1, about 10 cm in size, was built out of hollow metal channels with a diameter down to 100 μm and submerged horizontally in a vessel filled with water. The diameter exponent Δ of the structure was 2 and the structure consisted of 3 generations. It was observed that when air was blown through the horizontal structure, bubbles of the same size rose from the 64 exits. Moreover, even at relatively high gas rates, the bubbles rose in nice parallel streets without visible coalescence either horizontally or vertically. Such uniform behavior is highly desirable for gas/liquid absorption, aeration and other reactor processes, because it makes the mass transfer of components between the gas and liquid phase very efficient.

EXAMPLE 4

The experiment of Example 3 was repeated, but now a vessel filled with glycerol was used instead. Similar results were obtained; bubbles of the same size rose from the 64 exits when air was blown through the horizontal structure. Again the bubbles rose in nice parallel streets without visible coalescence either horizontally or vertically.

What is claimed is:

1. Method for operating a multi-phase process that is chemical, physical, or both, in a vessel containing at least two different phases selected from the group consisting of a liquid phase, a gas phase and a solid phase, inside which vessel a fluid is distributed through a hierarchical network of channels comprising parent and child generations of channel formations, wherein substantially each channel in a parent generation is divided into N channels of a child generation, wherein each channel of said child generation may in turn be a parent for channels in a successive child generation, which network terminates in channel exits, such that said fluid is discharged from the channel exits substantially uniformly throughout the vessel volume.

2. Method according to claim 1 in which said network is a self-affine network of channels, wherein each of the channels in the parent generation has a diameter $d_j$ and a length $l_j$, and each of the channels in the child generation has a diameter $d_{j+1}$ and a length $l_{j+1}$, wherein at least one of the ratios $d_j/d_{j+1}$ and $l_j/l_{j+1}$ is substantially constant for channels of successive generations running in parallel direction.

3. Method according to claim 2 wherein the diameters or the lengths of channels in successive generations of said network, or both, are related to N by at least one of the following relationships:

$$N=(d_j/d_{j+1})^\Delta,$$

and $$N=(l_j/l_{j+1})^D,$$

wherein Δ and D each represents an integer or a real positive number.

4. Method according to claim 2, wherein said self-affine network is a self-similar network, in which the ratios $d_j/d_{j+1}$ and $l_j/l_{j+1}$ are both substantially constant for channels of successive generations independent of their direction.

5. Method according to claim 1, in which said multi-phase process is selected from a group consisting of a fluidized bed process, a slurry process, an absorption process, a gas/liquid bubble column process, and an aeration process.

6. Method for operating a process that is chemical, physical, or both, in a vessel containing at least two different phases selected from the group consisting of a liquid phase, a gas phase and a solid phase, throughout which vessel a fluid is distributed through a hierarchical network of channels comprising parent and child generations of channel formations, wherein substantially each channel in a parent generation is divided into N channels of the child generation, wherein each channel of said child generation may in turn be a parent for channels in a successive child generation, which network terminates in channel exits, such that said fluid is discharged from the channel exits substantially uniformly throughout the vessel volume, wherein said network is a self-affine network of channels, wherein each of the channels in the parent generation has a diameter $d_j$ and a length $l_j$, and each of the channels in the child generation has a diameter $d_{j+1}$ and a length $l_{j+1}$, wherein at least one of the ratios $d_j/d_{j+1}$ and $l_j/l_{j+1}$ is substantially constant for channels of successive generations running in parallel direction, wherein the ratio of lengths of channels in successive generations of said network is related to N by the formula, $N=(l_j/l_{j+1})^D$, wherein D is between 2 and 3.

7. Method according to claim 6, wherein the ratio of diameters of channels in successive generations of said network is related to N by the formula, $N=(d_j/d_{j+1})^\Delta$, wherein Δ represents an integer or a real positive number.

8. Method according to claim 6, wherein said self-affine network is a self-similar network in which the ratios $d_j/d_{j+1}$ and $l_j/l_{j+1}$ are both substantially constant for channels of successive generations, independent of their direction.

9. Method for scaling up a multi-phase process that is chemical, physical, or both, and that is carried out in a vessel containing at least two different phases selected from the group consisting of a liquid phase, a gas phase and a solid phase, comprising the steps of:

building a small scale vessel;

distributing a fluid through a hierarchical network of channels comprising parent and child generations of channel formations, wherein substantially each channel in a parent generation is divided into about N channels of the child generation, wherein each of the channels in the parent generation has a diameter $d_j$ and a length $l_j$ and each of the channels in a child generation has a diameter $d_{j+1}$ and a length $l_{j+1}$, which network terminates in channel exits, such that said fluid is discharged from the channel exits substantially uniformly throughout the vessel volume;

determining optimal geometry and optimal values for the parameters, N, Δ and D, wherein the diameters or the lengths of channels in successive generations of said network, or both, are related to N by at least one of the following relationships: $N=(d_j/d_{j+1})^\Delta$ and $N=(l_j/l_{j+1})^D$, wherein Δ and D each represents an integer or a real positive number; and subsequently building a large scale vessel having substantially the same geometry and parameters as the small scale vessel, and having a larger number of generations than the small scale vessel.

* * * * *

(12) EX PARTE REEXAMINATION CERTIFICATE (5185th)
United States Patent
Coppens

(10) Number: US 6,333,019 C1
(45) Certificate Issued: Aug. 16, 2005

(54) METHOD FOR OPERATING A CHEMICAL AND/OR PHYSICAL PROCESS BY MEANS OF A HIERARCHICAL FLUID INJECTION SYSTEM

(75) Inventor: Marc-Olivier Coppens, Tuinwijklaam 47, B-9000 Gent (BE)

(73) Assignee: Marc-Olivier Coppens, Ghent (BE)

Reexamination Request:
No. 90/006,406, Oct. 1, 2002

Reexamination Certificate for:
Patent No.: 6,333,019
Issued: Dec. 25, 2001
Appl. No.: 09/301,971
Filed: Apr. 29, 1999

(51) Int. Cl.$^7$ .......................... B01J 19/00; B01D 47/00; C07C 27/00; C07C 27/06
(52) U.S. Cl. ................. 423/659; 23/293 R; 23/313 FB; 261/20; 261/DIG. 70; 261/DIG. 71; 423/DIG. 16; 518/728
(58) Field of Search ........................ 423/659, DIG. 16; 23/293 R, 313 FB; 261/20, DIG. 70, DIG. 71; 518/728

(56) References Cited

U.S. PATENT DOCUMENTS 5,354,460 A * 10/1994 Kearney et al. .......... 210/198.2
5,938,333 A *  8/1999 Kearney ..................... 366/366

OTHER PUBLICATIONS

Kearney, et al., "Proceedings from the 30$^{th}$ Biennial Meeting Operations" American Society of Sugar Beet Technologists, Orlando, Florida, Feb. 10–13, 1999.*

Kearney, M., "Engineered Fractal Cascades for Fluid Control Applications," Paper distributed at the Fractals in Engineering conference held Jun. 25–27 1997 in Aracachon, France.*

Promotional brochure of Amalgamated Research Inc., first publicly distributed at least as early as Jun. 4, 1997.*

Bassingthwaighte, et al., Fractal Physiology, 1994, no month, Oxford University Press, New York, pp 3–33.*

* cited by examiner

*Primary Examiner*—Steven Bos

(57) ABSTRACT

The invention relates to injection of fluids (gas, liquid, suspension or other mixtures) in a controlled typically uniform way within a vessel containing another fluid or fluidized medium. Said injection device consists of pipes or channels that are connected in a hierarchical fashion so that the fluid entering a first channel is divided into channels of the same or different diameter and length, each or some of which are further divided into channels of the same or different diameter and length, and so on. The injection system can also consist of combinations of such tree-like or fractal-like elements, embedded in the plane or in space.

The embodiment depends upon the nature of the fluids and the application. The invention can be used for gas/solid fluidized bed and a gas/liquid and other processes. A typical application is the reduction and uniformization or otherwise control of bubble sizes to optimize the operation of fluidized bed, slurry and gas/liquid reactors.

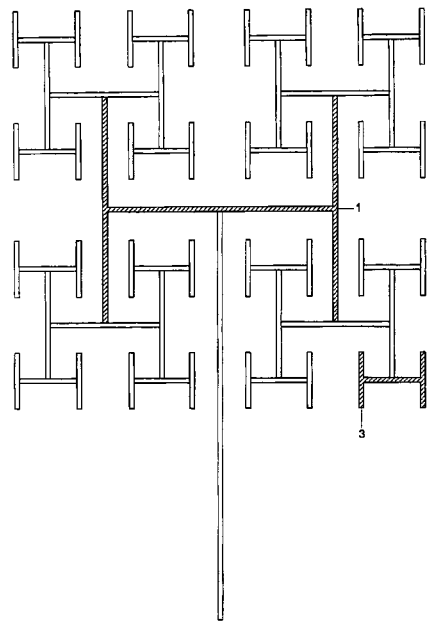

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 6, 7 and 8 are cancelled.

Claims 1, 4, 5 and 9 are determined to be patentable as amended.

1. Method for operating a multi-phase *fluid interaction* process that is chemical, physical, or both, in a vessel containing *fluids of* at least two different *fluid* phases selected from the group consisting of a liquid phase, a gas phase and a *fluidized* solid phase, inside which vessel a fluid *of one of said fluid phases* is distributed through*out a fluid of another of said fluid phases by means of* a hierarchical network of channels comprising parent and child generations of channel formations, wherein substantially each channel in a parent generation is divided into N channels of a child generation, wherein each channel of said child generation may in turn be a parent for channels in a successive child generation, which network terminates in channel exits, such that said fluid *in said network of channels* is discharged from the channel exits *into said another fluid phase in a* substantially uniform[ly] *way* throughout the vessel volume, *wherein said network is a self-affine network of channels, wherein each of the channels in the parent generation has a length $l_j$, and each of the channels in the child generation has a length $l_{j+1}$, wherein the ratio $l_j/l_{j+1}$ is substantially constant for channels of successive generations running in parallel direction, and wherein the lengths of channels in successive parallel generations of said network are related to N by the relationship $N=(l_j/l_{j+1})^D$, wherein D is greater than 2 and less than 3.*

4. Method according to claim [2] *1*, wherein said self-affine network is a self-similar network, in which, *further,* each of the channels in the parent generation has a diameter $d_j$, each of the channels in the child generation has a diameter $d_{j+1}$ *and* the ratios $d_j/d_{j+1}$ and $l_j/l_{j+1}$ are both substantially constant for channels of successive generations independent of their direction.

5. Method according to claim 1, in which said multi-phase *fluid interaction* process is selected from a group consisting of a fluidized bed process, a slurry process, an absorption process, a gas/liquid bubble column process, and an aeration process.

9. Method for scaling up a multi-phase *fluid interaction* process that is chemical, physical, or both, and that is carried out in a vessel containing *fluids of* at least two different *fluid* phases selected from the group consisting of a liquid phase, a gas phase and a *fluidized* solid phase, comprising the steps of:

building a small scale vessel;

distributing a fluid [through] *of one of said fluid phases throughout a fluid of another of said fluid phases by means of* a hierarchical network of channels comprising parent and child generations of channel formations, wherein substantially each channel in a parent generation is divided into about N channels of the child generation, wherein each of the channels in the parent generation has a diameter $d_j$ and a length $l_j$ and each of the channels in a child generation has a diameter $d_{j+1}$ and a length $l_{j+1}$, which network terminates in channel exits, such that said fluid *in said network of channels* is discharged from the channel exits *into said another fluid in a* substantially uniform[ly] *way* throughout the vessel volume;

determining optimal geometry and optimal values for the parameters[,] N[, Δ] and D, wherein [the diameters or] the lengths of channels in successive *parallel* generations of said network[, or both] are related to N by [at least one of the following relationships: $N=(d_j/d_{j+1})^\Delta$ and] $N=(l_j/l_{j+1})^D$, wherein [Δ and D each represents an integer or a real positive number,] *D is greater than 2 and less than 3*; and subsequently building a large scale vessel having substantially the same geometry and parameters as the small scale vessel[,] and having a larger number of generations than the small scale vessel.

* * * * *